INDICATOR AND STOP FOR MAGNETIC WIRE RECORDERS

Filed Aug. 23, 1946 2 SHEETS—SHEET 1

INVENTOR
HERMAN NYGAARD
BY
Pennie, Edmonds, Morton and Barrows
ATTORNEYS

INVENTOR
*HERMAN NYGAARD*
BY
*Pennie, Edmonds, Morton and Barrows*
ATTORNEYS

Patented Sept. 23, 1952 2,611,550

UNITED STATES PATENT OFFICE 2,611,550

INDICATOR AND STOP FOR MAGNETIC WIRE RECORDERS

Herman Nygaard, Poughkeepsie, N. Y.

Application August 23, 1946, Serial No. 692,724

10 Claims. (Cl. 242—54)

This invention relates to a position indicating and stop actuating mechanism operatively associated with a continuously advanced wire or like filamentary member. Mechanism in accordance with the invention may advantageously be incorporated in sound recording and reproducing apparatus employing a wire of magnetic material as a record medium, although, as will be apparent, the invention is not limited to such application.

In magnetic wire recorders of conventional design a fine wire having suitable magnetic properties is advanced past recording or reproducing pole pieces while unwinding from a supply spool and winding on a take-up or temporary storage spool. To provide a long-playing record the wire may be several thousand feet in length and therefore it becomes highly desirable to have a reliable indication of the position along its length at which the recording or reproducing means is set to operate, both to keep track of the relation between the used and unused lengths of the wire and to be able to index and subsequently identify different portions of a record.

In recorders of earlier design such indication has commonly been furnished by a scale and pointer arrangement wherein one of the members was positively driven, as by gearing, from the shaft mounting one of the wire spools, the other member being stationary. With such an arrangement the indication furnished is reliable only if the wire and indicator have first been synchronized in a reference position, for example, at an end of the wire with one spool empty and the other full. If this cannot be done or if the relation between wire and indicator is changed after the indicator has been set, as when partially wound spools are mounted on the apparatus, the indication may be false. Likewise, when a stop is provided for the purpose of inactivating the wire-driving means when the end of the wire is reached and this stop comes into play at a position determined by the above indicator means, or mechanism acting in synchronism therewith, the stop cannot, in general, be relied upon to perform its function in connection with spools mounted in a partly wound condition.

The present invention overcomes the above and other disadvantages of the prior art by providing indicator means whose operation is not based upon the measurement of the number of revolutions, from a reference position, made by one of the spools but instead is based upon the ratio of the rotational speeds of the two spools. This speed ratio is determined by the diameters of the turns of the windings on the respective spools between which the wire is transferred and varies inversely with the relation between said diameters, due to the necessarily uniform linear velocity of all portions of the wire undergoing transferal. When the wire is of considerable length, it winds on the spools in multiple layers and the diameter of the turns in the outer layer of each winding is a function of the length of wire on the spool which, under certain conditions, may approach direct proportionality, although such relationship is not necessary for the operation of the invention. It follows, then, that the ratio of the rotational speeds of the spools in such an arrangement is, at any time, a measure of the ratio of the lengths of wire respectively carried thereby.

The invention, by utilizing this principle, provides indicator means in the operation of which, once an initial adjustment has been made in accordance with the type of spool and standard length of wire used, the indication of the relative lengths of wire on the two spools becomes independent of the amounts of wire in the windings when the spools are mounted in the apparatus.

The invention also comprises a stop operated by the indicator-actuating means and similarly independent of the initial relation between the amounts of wire on the two spools.

It is an object of the invention to provide, in apparatus employing a filamentary member of selected length transferable between level-wound multiple-layer windings thereof on a pair of spools of selected dimensions, means supplying during operation a continuous indication of the relative lengths of wire on the spools which is independent of the initial relation therebetween when the spools are introduced into the apparatus.

Another object is to provide in apparatus of the above character means providing an indication of the relative lengths of the filamentary member on the spools, which is actuated in accordance with the relation between the rotational speeds of the spools, as controlled by the relation between the diameters of the turns of the respective outer layers of said multiple-layer windings thereon.

Another object is to provide in apparatus of the above character self-adjusting means continuously repositioned, during operation, in accordance with the varying speed ratio of the spools as the filamentary member is transferred between outer layers of the multiple-layer windings respectively carried thereby, for indicating and control purposes.

Another object is to provide in apparatus of the above character having means for driving one of the spools thereof, an adjustable stop for inactivating said driving means at a selected position of the filamentary member.

A further object is to provide apparatus of the above character which is especially adapted for use in connection with sound recording apparatus employing a magnetic record wire as the transferable filamentary member.

Other objects not specifically referred to will be apparent upon consideration of the means and method of the invention, as described herein.

According to its general aspects the invention contemplates the association with supply and take-up spools between which a wire or other filamentary member is transferable by rotation of the take-up spool, of a two-part speed comparison device having the parts thereof independently rotated through driving connections to the two spools, respectively. A difference in speed between the two rotating members of said device results in the repositioning of a speed-adjusting member of an adjustable speed gear in one of said driving connections, to wipe out the difference. The position of the speed-adjusting member provides a measure of the ratio of the speeds of the two spools and, hence, with level winding of the wire in multiple layers, for which provision is made, measures of relative lengths of wire on the spools. At a selected position of the same member means are brought into play actuating a stop to remove power from the driven spool.

The invention will be better understood from consideration of the following detailed description, with reference to the appended drawings in which.

Figure 1:
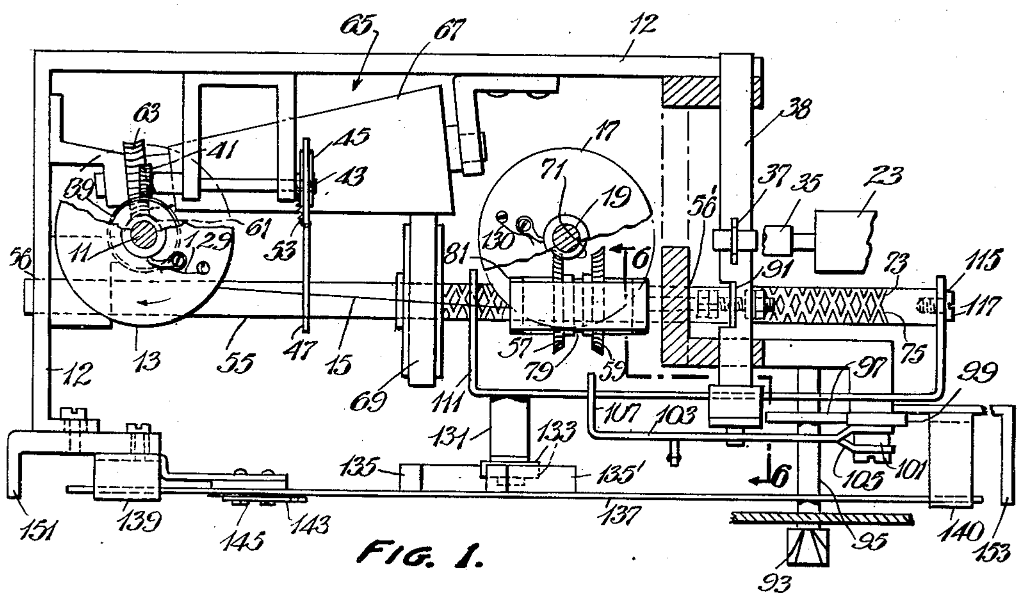
Fig. 1 is a plan view of indicator and stop means for a magnetic wire recorder, in accordance with the invention.

In the figures, which illustrate the application of the invention to a magnetic wire recorder, there is shown a shaft 11, suitably journaled on the frame 12 of the apparatus, mounting take-up spool 13 on which, during the making and playing back of a record, magnetic record wire 15 winds while unwinding from supply spool 17 mounted on shaft 19, also suitably journaled on frame 12, the shafts being in spaced parallel relation. The two spools are preferably, but not necessarily, similar in form and are illustrated as having rectangular winding spaces, which is a convenient but not necessary shape. To simplify the illustration of the invention the spools are shown mounted on their respective shafts intermediate other members carried thereby. In practice, the spools may be mounted at the ends of the shafts, to facilitate their insertion in the apparatus and removal therefrom. It is to be understood, also, that in its travel from one spool to the other wire 15 passes by recording, playback or other means connected with the making and reproducing of the record. Such means form no part of the present invention and are omitted from the drawings, again in the interest of simplification.

For rotating take-up spool 13 in the direction indicated by the arrow to advance wire 15 in what will be termed the "forward" direction, which is the direction in which the wire advances while recording and playing-back of the record take place, and, alternatively, for rotating supply spool 17 in a direction which reverses the direction of advancement of the wire for rewind purposes, there is provided a reversing friction drive 20 actuated by a motor 21. Motor 21, through a reduction gear 23, drives a countershaft 25 on which are mounted conical friction disks 27 and 29, adapted to engage and rotate mating friction disks 31 and 33 on shafts 11 and 19, respectively. Selective engagement of disks 27 and 31 or disks 29 and 33 is provided for by a splined coupling 35 between shaft 25 and the motor output shaft, together with a shifter fork 37 fixed on and rotatable with a shaft 38, by means of which the countershaft assembly may be displaced from the neutral position illustrated in Fig. 2 in either direction to effect engagement of the desired pair of disks. Preferably a higher speed during rewinding is provided for than during advancement of the record wire in the forward direction, this being accomplished by suitable ratios of the diameters of the two pairs of disks.

In accordance with the principles of the invention, the record wire 15 is wound on spools 13 and 17 in multiple layers. In other applications of the invention employing a relatively large size wire or other filamentary member, a perfectly uniform distribution in even layers may be achieved, but in the illustrated case of a magnetic recorder the fine size of wire used, of the order of 0.004 inch in diameter, makes it impractical to achieve a true "layer" winding, with every turn in the exact position implied by this term. However, a good approximation to such arrangement may be had by the use of means for traversing the wire at a suitable rate to and fro across the winding space of the spool on which it winds, thereby approaching an even layer distribution. A distribution such as is attained by these means is termed herein a "level" winding. To this end an arrangement is provided, best seen in Fig. 3, in which shaft 11, by way of meshing helical gears 39, 41, the latter on transverse shaft 43, drives a heart-shaped cam 45 on shaft 43. Cam 45 has a bent, rocking follower 47, pivoted at 49, provided with an elongated slot 51 in the end of the arm thereof remote from the cam and having the end of the other arm thereof pressed against the cam periphery by a spring 53. Slot 51 serves as a guide for the record wire and due to the traverse of this guide, by means of cam 45, across the winding spaces of spools 13 and 17, at a greatly reduced rate relative to the rotation of the spools, the wire when winding on either spool is arranged as a level winding. In certain arrangements, particularly when the winding spaces on the spools are relatively narrow, the described wire traversing means may be dispersed with, the wire automatically winding in substantially a level manner.

Rotation of one of the wire spools, for example spool 13, rotates the other spool, for example spool 17, by the pull of or through tension in the wire. Due to the requirement of uniform linear velocity in all portions the wire in the process of transferal from one spool to the other, the relation between the angular velocities or rotational speeds of the spools varies inversely as the ratio of the diameters of the outer layers of the respective windings thereon changes. According to the invention a comparison is made between said rotational speeds. To this end a two-part speed comparison device is provided comprising a rotatable shaft 55 which is also slidable axially in its bearings 56, 56', and one of gears 57, 59 restrainedly rotatable thereabout. Gear 57 is active and gear 59 inactive during forward advancement of the record wire while during rewinding the opposite is true, as will be explained.

Shaft 55 is rotated from shaft 11, mounting spool 13, by way of worm 61, worm wheel 63 and adjustable speed gear 65, comprising friction cone 67 and friction wheel 69 fixed on shaft 55. Gear 57 or gear 59, the selection being made by means to be described, is rotated from shaft 19, mounting spool 17, by engagement with a worm 71 thereon.

Figures 5, 6:
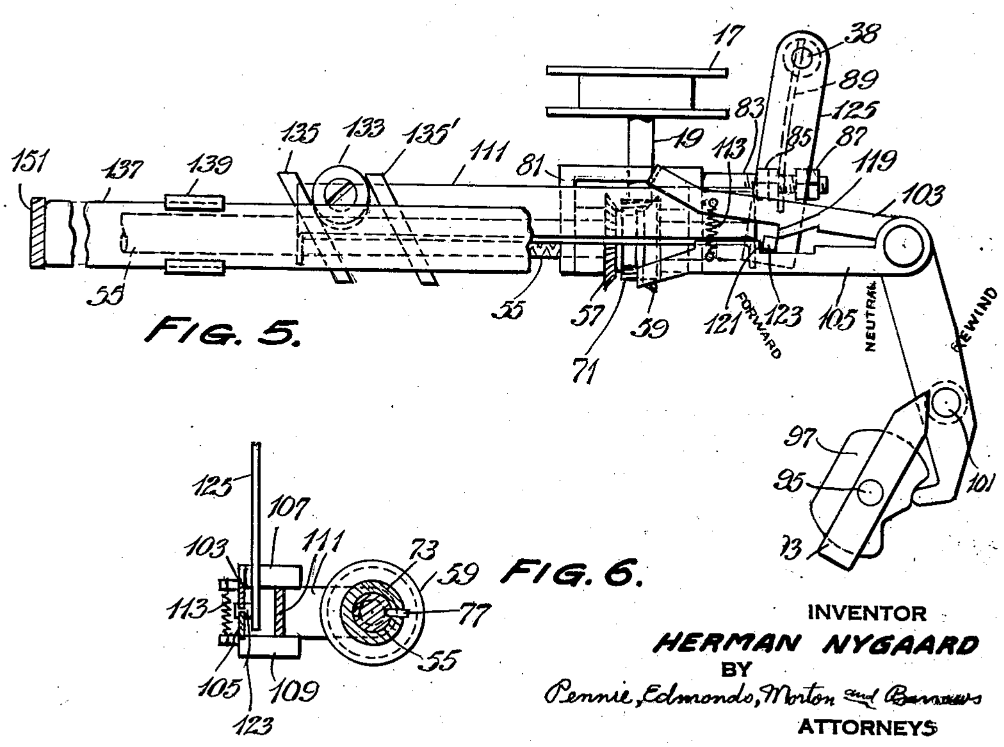
Fig. 5 is a fractional elevational view similar to Fig. 4 illustrating the operation of the stop mechanism at the other limit of the travel of the record wire.
Fig. 6 is a partial section along the line 6—6 of Fig. 1.

Shaft 55 is provided with a pair of helical grooves 73 and 75, the former left-hand and the latter right-hand, and the two gears are respectively engaged with these grooves or threads by suitable means, illustrated in Fig. 6 in connection with gear 59 as a pin 77 which may have a pressed fit in the hub of the gear and a loose fit in right-hand groove 75. Similar means (not shown) are provided for engaging gear 57 with left-hand groove 73.

Gears 57 and 59, spaced by a collar 79, are held between the two arms of a yoke 81, each having a hole through which shaft 55 passes loosely. Yoke 81 has a rod extension 83 threaded at the end to receive nuts 85 and 87, serving as adjustable abutments for a leaf spring 89 fitting over the rod, together with respective lock nuts 85' and 87'. Spring 89 is fast to shaft 38 at a notched portion 91 thereof for displacement with the shaft. Shaft 38 bearing spring 89 and shifter fork 37 is selectively rotatable to three positions by the angular displacement of a control knob 93 fast on a shaft 95 which mounts a cam 97 having a follower 99 pivoted to stationary means at 101 and pivotally connected at the end thereof opposite the cam to a pair of longitudinally displaceable latch arms 103 and 105. A spring 106 holds the follower against the periphery of the cam. Spread and bent end portions 107 and 109 of arms 103 and 105, respectively, are urged toward engagement with opposite longitudinal edges of a bail 111 by a spring 113 connecting the two arms. See Fig. 6. Bail 111 is mounted for rotation about shaft 55 and for translation therewith, the latter motion being provided for by a shouldered end portion 115 of shaft 55 allowing slight axial clearance, and a retainer screw 117.

Latch arm 103 has a notched inner edge including a portion 119 extending normally of the longitudinal axis of the arm while arm 105 has a notched inner edge of different contour including a portion 121 also extending normally of the axis of the arm. In the position of the arms shown in Fig. 2 longitudinally extending portions of the respective notched inner edges of the latch arms are pressed by spring 113 against one pair of opposed faces of a square boss 123 while normally or transversely extending portions 119 and 121 of said edges are in loose engagement with the pair of opposed faces of boss 123 at right angles to said first pair. Boss 123 extends from an arm 125 fixed to shaft 38.

It will be apparent that longitudinal displacement of latch arms 103, 105, in either direction, by the operation of knob 93 and displacement of cam 97 and follower 99, is effective to cause corresponding angular displacement of shaft 38. In one direction of displacement of the latch arms, motion is transmitted by the engagement of notch edge 119 of arm 103 with boss 123 and in the other direction by the engagement of notch edge 121 of arm 105 with the boss.

Figures 2, 3:
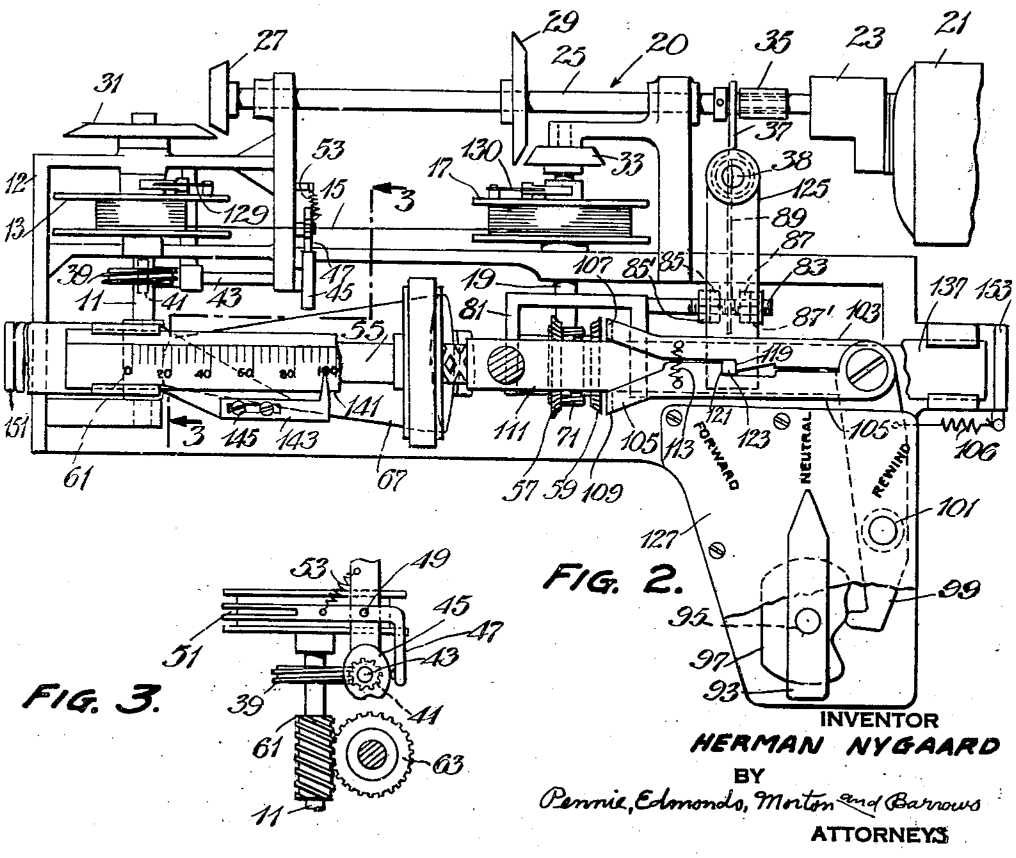
Fig. 2 is an elevational view of the mechanism of Fig. 1.
Fig. 3 is a section along the line 3—3 of Fig. 2.

The three positions of knob 93 are designated on a stationary marking plate 127 as "Forward," "Neutral" and "Rewind," respectively. With the knob in the Neutral position conditions will be as shown in Fig. 2 if the knob has been turned thereto from the Forward position. Latch arms 103, 105 are at the mid-position of their travel. Shifter fork 37 is positioned to disengage both pairs of driving friction disks 27, 31 and 29, 33. Leaf spring 89 exerts no pressure tending to move rod 83 and yoke 81 attached thereto. Gear 57 therefore remains engaged with worm 71 as it was when knob 93 was in the Forward position.

Figure 4:
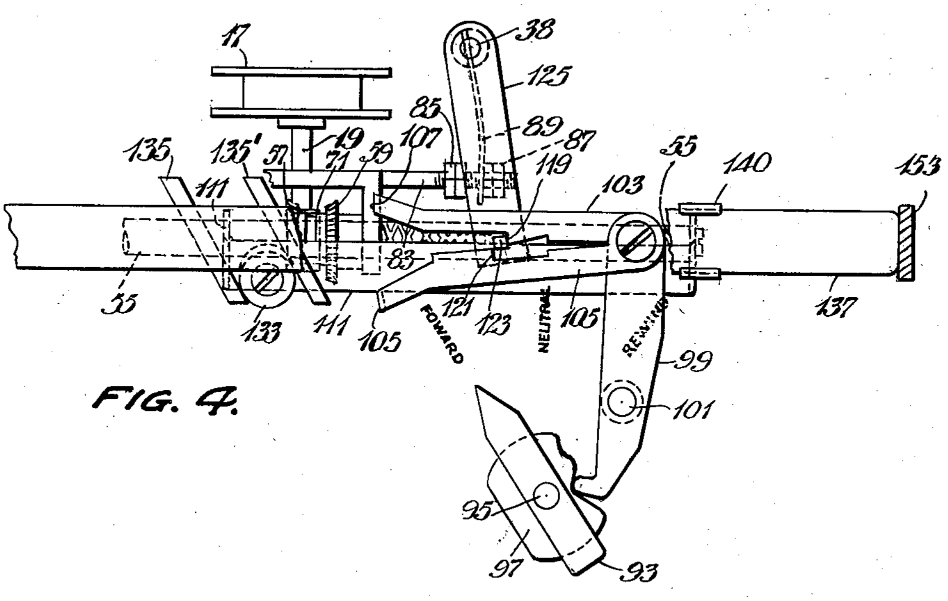
Fig. 4 is a fractional elevational view, as in Fig. 2, illustrating the operation of the stop mechanism at one limit of the travel of the record wire.

If, now, knob 93 is again turned to the Forward position latch arms 103, 105 are displaced toward the right thereby causing notch edge 121 of arm 105 to carry boss 123 to the right and angularly displace arm 125 and shaft 38 in a counterclockwise direction. Shaft 38 carries with it shifter fork 37 to cause engagement of friction disks 27, 31 and the driving of spool 13. Angular displacement of shaft 38 also displaces leaf spring 89 which meets abutment nut 87 and is resiliently deformed, thereby holding gear 57 in engagement with worm 71. This condition of the spring is seen in Fig. 4.

If instead, knob 93 is turned from the Neutral position illustrated in Fig. 2 to the Rewind position, latch arms 103, 105 are shifted toward the left, with notch edge 119 actively engaging boss 123 to rotate arm 125 and shaft 38 in a clockwise direction, thereby displacing fork 37 to the right and causing engagement of friction disks 29, 33 and the driving of spool 17. Spring 89 is also rotated in a clockwise direction and meets abutment nut 85, thus displacing rod 83 and yoke 81 toward the left. The travel of yoke 81 is sufficient to disengage gear 57 from worm 71 and engage gear 59 therewith, under the resilient urging of spring 89.

If knob 93 is again rotated to the Neutral position the motor drive is disconnected but gear 59 remains in engagement with worm 71.

The position-indicating function of the means of the invention may now be explained. Assume, first, that knob 93 is in the Forward position. Rotation of spool 13 transfers wire thereto from spool 17 and the traversing of the slotted arm of cam follower 47, with which the wire is engaged, across the winding space of the spool arranges the wire in a multiple-layer level winding thereupon. It is assumed that the wire has previously been wound in similar fashion on spool 17. As spool 13 is rotated by motor 21 spool 17 is rotated by the pull of the connecting wire. To insure a slight constant tension in the wire as it is transferred between spools and prevent slack, friction brakes 129 and 130 may act, respectively, on the hubs of spools 13 and 17.

Should the speed ratios between shaft 11 and shaft 55 and between shaft 19 and gear 57, respectively, be such that shaft 55 and gear 57 rotate together at the same speed, there will be no tendency for relative longitudinal displacement between the shaft and gear to occur. If, however, gear 57 rotates at a higher speed than shaft 55 the engagement of the gear hub with left-hand groove 73 in the shaft causes the shaft to be displaced toward the left in its bearings, the gear being held against axial displacement by yoke 81. Shaft 55 carries with it friction wheel 69 of adjustable speed gear 65 and thereby increases the speed ratio of this device to speed up shaft 55 until it rotates at the same speed as gear 57. In a similar manner if gear 57 rotates at a slower speed than shaft 55 the shaft and wheel 69 are displaced toward the right until equality of speed between the shaft and gear is established.

In its axial travel shaft 55 also carries with it bail 111 which has a laterally extending arm 131 rotatably mounting at its outer end a roller 133 positioned between a pair of guide members 135, 135' attached in an oblique position to a longitudinally displaceable bar 137 slidable in brackets 139 and 140 extending from frame 12. Bar 137 carries a scale 141 on which a stationary index 143 is readable. Index 143 may have a limited adjustment relative to the scale, as by means of a slot and screw arrangement 145. As bail 111 moves with shaft 55 bar 137 is carried with it, through roller 133 and one of guides 135, 135', whichever the roller presses against, and thus scale 141 is displaced relative to index 143. Roller 133 is held centralized in the oblique guide formed by members 135, 135' through the centralizing action of spring 113 and latch arms 103, 105 on bail 111.

Assume, now, that at the start of operation substantially all of record wire 15 is on supply spool 17 and that index 143 is adjusted, with the spools rotating, to the marking designated "100" on scale 141, to indicate that 100 per cent of the wire available for record purposes is unused. The turns of wire in the outer layer of the winding on spool 17 are of relatively large diameter while the corresponding turns on spool 13 are of relatively small diameter, assuming similar spools. Spool 13 therefore rotates faster than spool 17 and the ratios between the speeds of shaft 11 and shaft 55, and shaft 17 and gear 57, respectively, are so chosen that under this condition when shaft 55 and gear 57 rotate at the same speed, wheel 69 is near the right-hand limit of its travel, to attain a maximum speed ratio in adjustable speed gear 65 between the driving and driven member thereof.

As wire 15 is transferred from spool 17 to spool 13 the diameters of the windings and of the turns in the outer layers of the windings thereon change in complementary manner, the winding on spool 13 increasing in diameter and the winding on spool 17 decreasing in diameter. As this occurs shaft 55, with wheel 69, moves toward the left due to the balancing action of the speed comparison means comprising this shaft and gear 57, as has been described, and scale 141 moves relative to index 143 to provide a continuous indication of the percentage or the length of the unused portion of the record wire 15.

Any suitable units may be used in graduating scale 141 and, if desired, two sets of graduations may be provided, reading in opposite directions, for the direct indication of the lengths of both the used and unused portions of the wire.

Advancement of the wire in the forward direction may be stopped at any time by operating knob 93 to the Neutral position and the wire may then be rewound on the supply spool by operating knob 93 to the Rewind position, with the shifting of the drive to spool 17. During the rewinding operation the movement of scale 141 relative to index 143 is the reverse of that described above. The movement in this case is controlled by a comparison of the speed of gear 59 with that of shaft 55, gear 59 being engaged with worm 71 under this condition instead of gear 57. When gear 59 is driven from shaft 19 at a faster rate than shaft 55 is driven from shaft 11, the engagement of the gear hub with right-hand groove 73 in the shaft, by way of pin 77 causes the shaft to shift to the right and carry scale 141 with it, to rebalance the two speeds, this being the normal action which goes on during the rewinding operation. The gear, as pointed out in connection with gear 57, is axially restrained by yoke 81 thereby serving as an axially stationary nut for the grooved shaft. Should gear 59 run slower than shaft 55, for some reason, the speed balancing operation shifts shaft 55 and connected members to the left.

The graduation of scale 141 is not a linear one throughout the entire range, and is best determined experimentally. The law of variation of the relative displacement of scale 141 and index 143 with transferal of the wire from one spool to another is dependent, among other factors, on the ratio of width to depth of the winding spaces of the spools. If true layer winding were achieved, progressive changes of indication along scale 141 theoretically would take place only as changes from one layer to the next occur in the windings, the changes between successive layers, in general, not occurring simultaneously in the two windings. With narrow winding spaces these progressive changes of indication would occur more frequently than with wider spaces. In practice a true layer winding is not achieved and the change of indication becomes substantially continuous, or at least the discontinuities are of a lower order of magnitude, on the basis of percentage of the total scale length, than possible irregularities in indication due to other causes. Aside from the above considerations the effect of narrow winding spaces on the spools is to give relatively large rates of change of indication at the beginning and end of the winding and rewinding operations, while wider winding spaces result in a uniform rate of change of indication over a greater portion of the scale, with a less sensitive indication at the ends thereof. For most uses the latter type of indication is to be preferred.

In order to stop the wire drive when all of the wire has been wound on either spool, left-hand and right-hand stationary stops 151 and 153, respectively, are provided at suitable locations, adapted to engage bar 137 at the limits of its travel and deactivate the wire drive. The positions of these stops may be adjustable. Their operation at the end of the forward advancement of the wire and the end of the rewind operation is illustrated in Figs. 4 and 5, respectively.

Referring first to Fig. 4, bar 137 having been stopped in its travel by coming against stop 153, any further shift toward the right of bail 111 carrying roller 133 causes the roller to be displaced downwardly, as seen in the figure, through the action of guide member 135'. This displacement of the roller rotates bail 111 about the axis of shaft 55 (Fig. 1) against the force of spring 113 and thereby displaces latch arm 105 downwardly, as seen in Fig. 4. With knob 93 in the Forward position shaft 38 experiences a torque in a clockwise direction due to the deformation of leaf spring 89. When latch arm 105 moves downwardly until the upper extremity of notch edge 121 clears boss 123 on arm 125, the restraint on shaft 38 is removed, since boss 123 can now move to the left, and the shaft springs back to a central position thereby moving shifter fork 37 (Fig. 2) and operating countershaft 25 to its central position in which the friction disks of the wire drive 20 are disengaged. Advancement of wire 15 is thus stopped. Latch arms 103, 105 are not displaced longitudinally in the tripping operation above described but in moving knob 93 to the Rewind position the Neutral position is passed through, in which the latch arms are centralized.

Referring, now, to Fig. 5, the condition illustrated is the tripping of the latch holding the friction drive disks engaged when the end of the rewinding operation is reached. Bar 137 has moved to the left to engagement with stop 151 and a further movement in the same direction of bail 111 has caused roller 133 to be displaced upwardly through the action of guide 135, thereby rotating the bail against the force of spring 113 in a direction which has moved latch arm 103 upwardly until notch edge 119 therein has just cleared boss 123. The boss, carrying with it arm 125 and shaft 38, is about to be displaced to the right by the resilient force of leaf spring 89, acting through the shaft and arm 125, these several members thereby being returned to their central positions. Centralization of shaft 38 centralizes shifter fork 37 and countershaft 25 to disengage the friction disks of friction drive 20 and stop advancement of the wire in the rewind direction.

The means and method of operation of the invention disclosed herein provide for the continuous indication of the condition of a filamentary member, as to the relation of the lengths of the member on the two spools, during the reversible transferal thereof between a pair of spools on which the member winds. Automatic stopping of the advancement of the member when traveling in either direction between the spools is also provided for.

It is to be understood that the embodiment of the invention described herein is by way of illustration, only, and not by way of limitation, the scope of the invention being defined solely by the appended claims.

I claim:

1. In combination a pair of spools respectively rotatable about spaced axes, a filamentary member extending therebetween for winding in multiple layers thereupon, motive means for directly rotating one of said spools and thereby through tension in said member rotating the other spool to effect transfer of the member between the spools, and means for continuously indicating the relation between the rotative speeds of said spools comprising a pair of individually rotatable speed comparison members, driving connections between said spools and said members respectively, one of said connections including an adjustable speed gear, means for automatically equalizing the rotative speeds of said comparison members by adjustment of the speed ratio of said gear, and indicator means controlled in accordance with said adjustment, said adjustment being proportional to the ratio of the diameters of the outer layers of the windings on the two spools and thereby a function of the ratio of the lengths of the filamentary member constituting said windings, respectively.

2. In combination a pair of spools respectively rotatable about spaced axes, a filamentary member extending therebetween for winding in multiple layers thereupon, motive means for directly rotating one of said spools and thereby through tension in said member rotating the other spool to effect transfer of the member between the spools, traversing means in engagement with said member operative to produce level windings thereof on said spools, and means for continuously indicating the relation between the rotative speeds of said spools comprising a pair of individually rotatable speed comparision members, driving connections between said spools and said members respectively, one of said connections including an adjustable speed gear, means for automatically equalizing the rotative speeds of said comparision members by adjustment of the speed ratio of said gear, and indicator means controlled in accordance with said adjustment, said adjustment being a function of the ratio of the lengths of the filamentary member constituting said windings, respectively.

3. In combination a pair of spools respectively rotatable about spaced axes, a filamentary member extending therebetween for winding in multiple layers thereupon, motive means for directly rotating one of said spools and thereby through tension in said member rotating the other spool to effect transfer of the member between the spools, a pair of individually rotatable speed comparison members, driving connections between said spools and said members respectively, one of said connections including an adjustable speed gear, means for automatically equalizing the rotative speeds of said comparison members by adjustment of the speed ratio of said gear, displaceable means positioned in accordance with said adjustment, means for indicating the position of said displaceable means, and means for controlling said motive means upon displacement of said displaceable means to a preselected position thereof.

4. In combination a pair of spools respectively rotatable about spaced axes, a filamentary member extending therebetween for winding in multiple layers thereupon, motive means for directly rotating one of said spools and thereby through tension in said member rotating the other spool to effect transfer of the member between the spools, traversing means operative to produce level windings of said member on said spools, a pair of individually rotatable speed comparison members, driving connections between said spools and said members respectively, one of said connections including an adjustable speed gear, means for automatically equalizing the rotative speeds of said comparison members by adjustment of the speed ratio of said gear, displaceable means positioned in accordance with said adjustment, means for indicating the position of said displaceable means as a measure of the ratio of the lengths of the filamentary member wound on said spools, respectively, and means for controlling said motive means upon displacement of said displaceable means to a preselected position thereof.

5. In apparatus comprising a pair of spools rotatable about spaced axes and a filamentary member transferable therebetween upon rotatably driving one of the spools, said member forming multiple layer windings on the spools, means for directly driving one of said spools, said other spool being driven by the pull of the filamentary member, level winding means operative during transferal of the member, a threaded shaft, connections for rotatably driving said shaft from one of said spools, a nut on said shaft, connections for rotatably driving said nut from said other spool, an adjustable speed gear in one of said connectons having a continuously displaceable speed adjusting member, said adjusting member being operatively connected for displacement responsive to relative axial motion between said shaft and nut resulting from inequality of the respective speeds thereoef in a manner to restore equality of said speeds, displacement of said adjusting member being substantially continuous during transferal of the filamentary member due to the substantially continuous complementary change of effective winding diameters of the two spools, and means for indicating the position of said speed adjusting member as an indication of the respective lengths of the filamentary member on the two spools.

6. In means for indicating and controlling the progress of a filamentary member transferable between a pair of rotatable spools on which the member winds in multiple layer substantially level windings, motive means for directly rotating one of said spools and thereby through tension in said member rotating the other, the ratio of the rotative speeds of said spools being inversely proportional to the ratio of the diameters of the respective turns thereon between which the member is transferred, means for measuring and indicating said speed ratio and means actuated by said last means for controlling said motive means.

7. In means for controlling the progress of a filamentary member transferable between a pair of rotatable spools on which the member winds in multiple layer substantially level windings, motive means for directly rotating one of said spools and thereby through tension in said member rotating the other, the ratio of the rotative speeds of said spools being inversely proportional to the ratio of the diameters of the respective turns thereon between which the member is transferred, means for measuring said ratio, a latch positionable to hold said motive means activated and means actuated by said measuring means for tripping said latch and deactivating said motive means at a pre-selected value of said speed ratio.

8. In means for reversibly transferring wire or like filament between windings on a pair of spools, a reversing drive for reversibly advancing the wire by actuation of one of the spools, a shaft having right hand and left hand threads, a pair of nuts respectively engaged with said threads, connections for driving said shaft from one of said spools and driving one of said nuts from said other spool, including an adjustable speed gear in one of said connections having a continuously displaceable speed determining member, said member being repositioned responsive to inequality between the speeds of said shaft and said driven nut, control means for concurrently selecting the direction of advancement of the wire by actuation of said reversing drive and selecting the driven one of said two nuts whereby the displacement of said member for like speed differences may be reversed with reversal of the wire drive and said displacement caused to maintain equality between the speeds of shaft and nut during advancement of the wire in either direction, and means actuated in accordance with the position of said member.

9. Means for controlling the transfer of wire or a like filamentary member in either direction between multiple layer windings on a pair of spools comprising a reversing drive adapted reversibly to advance the wire by actuating one of the spools, a threaded shaft, connections for rotating said shaft from one of said spools including an adjustable speed gear, a nut on said shaft, connections for rotating said nut from the other of said spools, means for readjusting said adjustable speed gear responsive to inequality between the speeds of said shaft and nut in a manner to restore equality therebetween, a control for said reversing drive settable to advance the wire in either direction including a latch for holding said drive in an operative condition, and means for tripping said latch responsive to a pre-selected adjustment of said adjustable speed gear.

10. In a magnetic wire recorder a pair of spools of similar form rotatable about spaced parallel axes, magnetic wire arranged for transfer between said spools, said wire winding in multiple layers thereupon whereby the effective winding diameters and the relative speeds of the two spools changes in complementary fashion substantially continuously during transferal of the wire, a reversing drive, means for selectively actuating one of said spools thereby for reversibly advancing the wire, means for comparing the respective rotative speeds of sad two spools and indicating the ratio thereof, means for controlling said reversing drive including latch means for selectively setting and maintaining said drive in condition to operate in either direction, and means actuated by said comparison means for tripping said latch and rendering said drive inoperative responsive to a preselected value of said ratio.

HERMAN NYGAARD.

REFERENCES CITED

The following references are of record in the file of this patent:

UNITED STATES PATENTS

| Number | Name | Date |
|---|---|---|
| 1,414,941 | Gill | May 2, 1922 |
| 1,850,102 | Grout | Mar. 22, 1932 |
| 2,457,699 | Marsden | Dec. 28, 1948 |